United States Patent
Van Gestel

(10) Patent No.: US 6,775,842 B1
(45) Date of Patent: Aug. 10, 2004

(54) METHOD AND ARRANGEMENT FOR TRANSMITTING AND RECEIVING ENCODED IMAGES

(75) Inventor: Henricus Antonius Wilhelmus Van Gestel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/574,052

(22) Filed: May 18, 2000

(30) Foreign Application Priority Data

May 20, 1999 (EP) .......................................... 99201582

(51) Int. Cl.$^7$ .............................. H09N 7/16; H04N 7/08
(52) U.S. Cl. ....................... 725/136; 725/137; 725/138; 348/476; 348/478; 348/518; 348/464
(58) Field of Search ................................ 725/135, 136, 725/137, 138; 348/461, 468, 518, 465, 464, 476, 478

(56) References Cited

U.S. PATENT DOCUMENTS

| | | | | | |
|---|---|---|---|---|---|
| 4,393,376 | A | * | 7/1983 | Thomas | 345/547 |
| 5,321,514 | A | * | 6/1994 | Martinez | 725/62 |
| 5,432,558 | A | * | 7/1995 | Kim | 348/460 |
| 5,508,754 | A | * | 4/1996 | Orphan | 348/722 |
| 5,594,660 | A | * | 1/1997 | Sung et al. | 715/500.1 |
| 5,668,601 | A | * | 9/1997 | Okada et al. | 375/240.25 |
| 5,715,176 | A | * | 2/1998 | Mobini | 709/236 |
| 5,737,026 | A | * | 4/1998 | Lu et al. | 348/473 |
| 5,757,802 | A | * | 5/1998 | Yoo | 370/474 |
| 5,774,664 | A | * | 6/1998 | Hidary et al. | 725/110 |
| 5,793,927 | A | * | 8/1998 | Lane | 386/81 |
| 5,812,205 | A | * | 9/1998 | Milnes et al. | 348/460 |
| 5,822,317 | A | * | 10/1998 | Shibata | 370/395.62 |
| 5,956,090 | A | * | 9/1999 | Yamauchi | 348/441 |
| 6,061,056 | A | * | 5/2000 | Menard et al. | 345/704 |
| 6,065,042 | A | * | 5/2000 | Reimer et al. | 709/203 |
| 6,160,587 | A | * | 12/2000 | Walker et al. | 348/478 |
| 6,191,821 | B1 | * | 2/2001 | Kupnicki | 348/512 |
| 6,208,643 | B1 | * | 3/2001 | Dieterich et al. | 370/389 |
| 6,209,132 | B1 | * | 3/2001 | Harrison et al. | 725/141 |
| 6,278,733 | B1 | * | 8/2001 | Bennett et al. | 375/240 |
| 6,357,042 | B2 | * | 3/2002 | Srinivasan et al. | 725/32 |
| 6,466,275 | B1 | * | 10/2002 | Honey et al. | 348/722 |
| 6,516,005 | B1 | * | 2/2003 | Murayama et al. | 370/503 |

FOREIGN PATENT DOCUMENTS

WO    WO9619077    6/1996    .......... H04N/7/025

* cited by examiner

*Primary Examiner*—John Miller
*Assistant Examiner*—Annan Q. Shang

(57) ABSTRACT

TeleWeb services are currently being developed, in which HTML-encoded images are transmitted in the vertical blanking interval of a conventional analog television signal. For special applications, such as subtitling and targeted advertising, the relevant TeleWeb images must be displayed substantially in synchronism with given video frames of the television signal. This is achieved by transmitting the encoded images in advance and provide them with a time stamp (33) which specifies the display time in terms of a reference clock. The reference clock is preferably derived from the teletext clock time (31,32). A possible display time stamp format is hh:mm:ss'ff, where ff specifies a frame within a second. At the receiver end, the teletext clock is interpolated to reconstruct the reference clock, and the subtitles are buffered until the display time stamp matches the actual clock time.

7 Claims, 2 Drawing Sheets

METHOD AND ARRANGEMENT FOR TRANSMITTING AND RECEIVING ENCODED IMAGES

FIELD OF THE INVENTION

The invention relates to methods of transmitting encoded images in inactive video periods of an analog (i.e. PAL, NTSC, etc.) television signal and reproducing said images in synchronism with given frames of the television signal.

BACKGROUND OF THE INVENTION

A known method of transmitting encoded images in inactive video periods of an analog television signal for reproduction in synchronism with given frames of the television signal is provided by World System Teletext. Teletext, standardized in the early 70s, provides the facility to transmit subtitle pages along with other teletext pages in the vertical blanking interval of the television signal. The subtitles are transmitted in synchronism with the video scene. That is, each subtitle page is inserted in the teletext stream precisely at the time it is to be reproduced. Since teletext information is decoded in real time, the subtitle page is displayed without any delay.

More complex data service systems such as TeleWeb are currently being developed. TeleWeb images are images encoded in accordance with the HTML standard and transmitted in the vertical blanking interval of a television signal. The delay between transmission and display of a TeleWeb image is not known in advance and may vary from decoder to decoder. The unknown delay of a TeleWeb subtitle image poses a problem in that synchronization between a television program and its subtitling is difficult to achieve. This is especially the case when television program is being subtitled in several languages. The bandwidth of the system (one or few lines of the vertical blanking interval) is not sufficient to transmit all subtitles in real time.

OBJECT AND SUMMARY OF THE INVENTION

It is an object of the invention to overcome the above-mentioned problems.

To this end, the invention provides a method of transmitting an encoded image as defined in claim 1, a method of reproducing an image as defined in claim 4, a television receiver as defined in claim 7, and a television signal as defined in claim 8.

The invention provides advance transmission of encoded images, with a time stamp specifying the desired time of display being accommodated in the image data. The time stamp is related to a reference clock, samples of which are also transmitted in inactive video portions of the television signal. Preferably, the reference clock is the clock time which is transmitted in the page headers of a teletext service or in teletext packets 8/30. It is thereby achieved that no additional transmission capacity is required for transmission of the reference clock.

It should be noted that advance transmission of subtitles with time stamps is known per se from International Patent Application WO 96/19077. In this prior-art system, the subtitles are transmitted along with a compressed digital video signal. Digital video signals already include a reference clock. Digital television receivers comprise an input buffer in which the compressed video signal is buffered in order to compensate for the varying amounts of frame data. The encoded video frames include time stamps representing the time at which they have to be removed from the buffer and/or displayed, so that the buffer does not overflow or underflow. The transmitted reference clock thus controls the video display timing. As the time stamps in subtitle images relate to the same reference clock, the subtitles can exactly be synchronized with given frames of the video signal.

The teaching of WO 96/19077 cannot be applied to conventional analog television systems because the frames of an analog video signal are not identified by time stamps. Exact synchronization of a subtitle and a given frame as offered by digital systems can therefore not be achieved. Instead, the invention provides an estimation of the time at which the given frame will be displayed in terms of an external reference clock. The reference clock is transmitted along with the television signal but has no relation with its video contents. It has been found that the method provides sufficient accuracy of synchronization.

DESCRIPTION OF EMBODIMENTS

Figure 1:
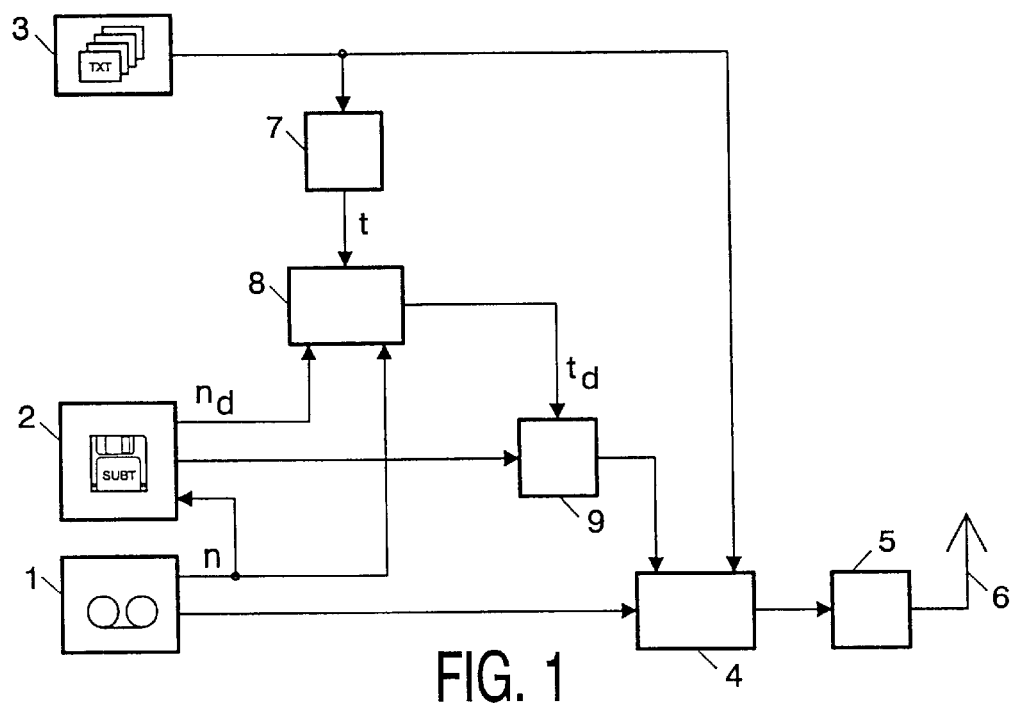
FIG. 1 shows a schematic diagram of a transmitter in accordance with the invention.

FIG. 1 shows a schematic diagram of a transmitter in accordance with the invention. It will be assumed that the television program being broadcast is a prerecorded program, i.e. the content is being played back from a video recorder 1. The video frames of the recorded television signal are consecutively numbered. The video recorder outputs the current video frame number n at a second output.

The subtitles associated with the television program have been prepared in advance. They are stored in the form of encoded images on a subtitling computer system 2. The computer also stores for each subtitle image the frame number $n_d$ of the video frame at which the subtitle is to be reproduced. The subtitling computer 2 receives the current frame number n from the video recorder 1.

The transmitter further comprises a conventional teletext source 3, which generates a cyclic sequence of teletext pages. The conventional teletext service includes transmission of a real time clock. As is generally known, the actual clock time is accommodated in the last 8 character positions of the page headers. Some transmitters also transmit the actual clock time in a special teletext packet which is commonly referred to as packet 8/30. In both cases, the time is transmitted in the format hh:mm:ss, and thus updated approximately once per second.

A data insertion circuit 4 inserts the subtitle image data and the conventional teletext data in selected lines of the vertical blanking interval of the video signal. The combined video signal is then applied to a modulator 5 for RF transmission via an antenna 6 or any other broadcasting network.

In accordance with the invention, the transmitter further comprises a teletext clock extraction circuit 7, a subtitle display time estimation circuit 8, and a time stamp insertion circuit 9. The clock extraction circuit 7 extracts the actual clock time samples from the teletext service (in the above-mentioned hh:mm:ss format) and includes interpolation means (or a phase-locked loop) to generate the actual clock time t at the frame rate resolution, i.e. in units of ¹/₂₅ sec (PAL) or ¹/₃₀ sec (NTSC).

Figure 2:
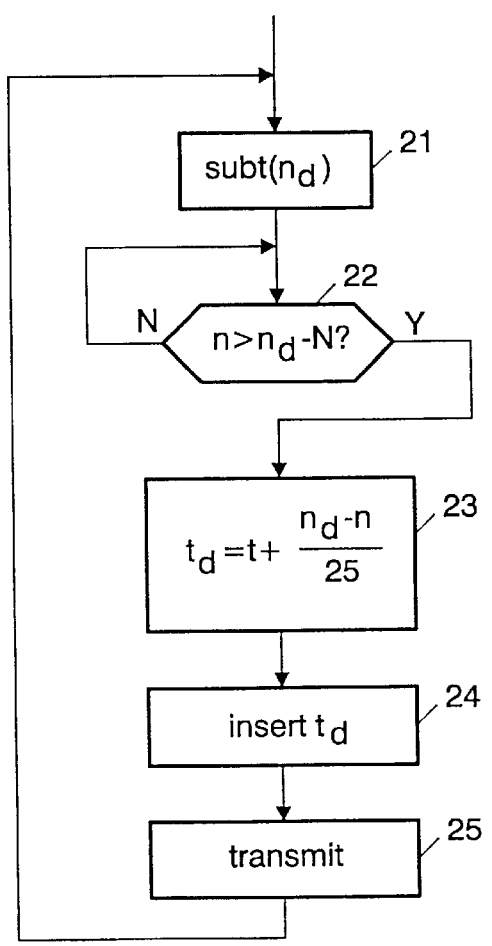
FIG. 2 shows a flow chart of operational steps carried out by the transmitter to illustrate its operation.

The operation of the transmitter will now be described with reference to a flow chart of operations shown in FIG. 2. In a step 21, the computer pre-fetches the next subtitle to be transmitted and reads the frame number $n_d$ of the video frame at which said subtitle is to be displayed. In a step 22, the computer receives the current frame number n and waits until n is larger than $n_d$-N, where N is the number of frames corresponding to a given period of time. For example, N=125 for PAL systems or N=150 for NTSC systems to represent a time period of 5 seconds. The condition n>$n_d$-N thus means that the subtitle is to be displayed within 5 sec. If the condition is fulfilled, a step 23 is performed (by the subtitle display time estimation circuit 8) in which the actual clock time at which the subtitle is to be displayed is estimated in accordance with:

$$t_d = t + \frac{n_d - n}{25} \text{ (for PAL), or}$$

$$t_d = t + \frac{n_d - n}{30} \text{ (for NTSC).}$$

In a step 24, the estimated time $t_d$ is inserted image in the form of a time stamp in the encoded subtitle (this operation is carried out by the time stamp insertion circuit 9). The subtitle including the time stamp $t_d$ is then transmitted in a step 25. It will be appreciated that the subtitle will thus be transmitted 5 seconds in advance.

The transmission of a subtitle takes some time, depending upon encoding efficiency and available bandwidth. After transmission, the computer returns to the step 21 to fetch the next subtitle. It should be noted that the next image to be transmitted may relate to the same frame number $n_d$, for example, because it provides the same subtitle in a different language. In that case, the condition n>$n_d$-N (step 22) is immediately fulfilled. As both the actual video frame number n provided by the video recorder and the real time clock t have meanwhile progressed in synchronism, such a subsequent subtitle will be transmitted with substantially the same time stamp $t_d$.

Figure 3:
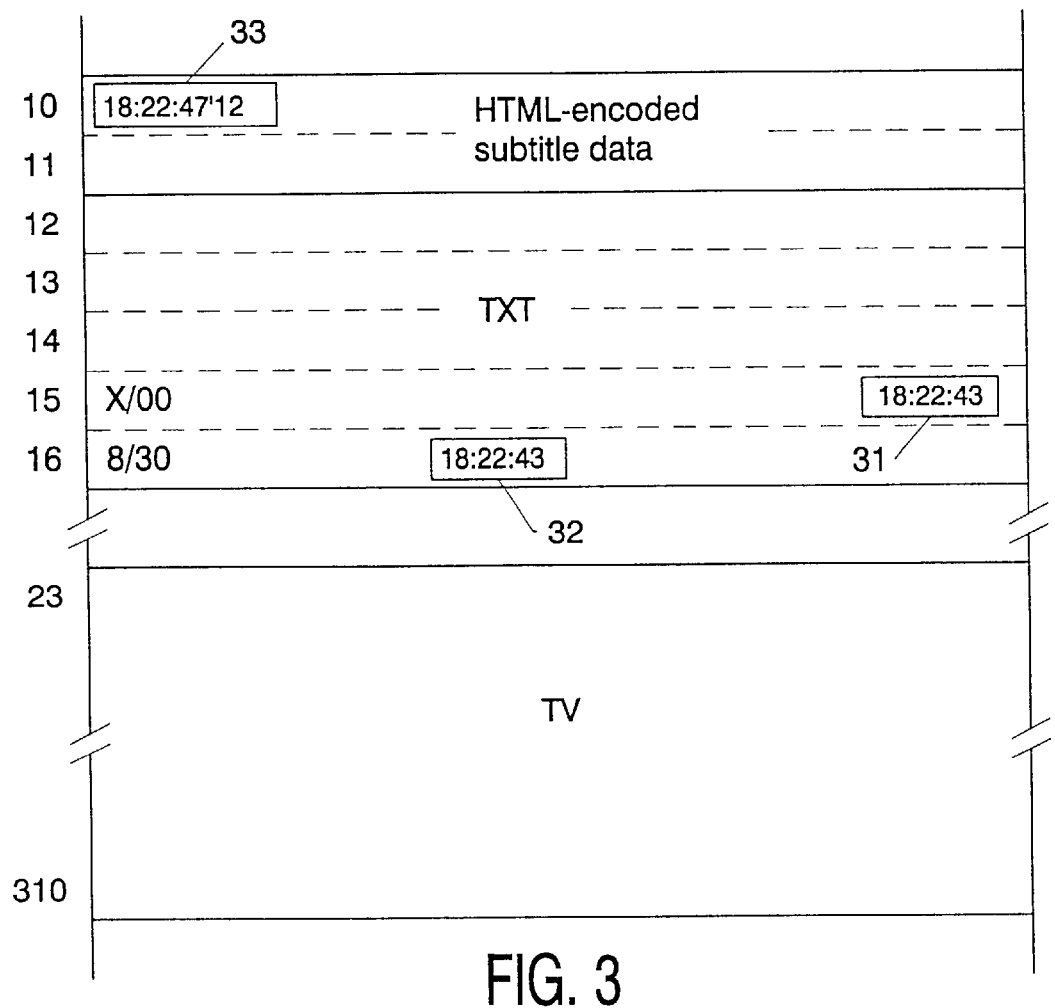
FIG. 3 shows a possible format of the television signal in accordance with the invention.

FIG. 3 shows one field of the analog television signal which is transmitted by the transmitter shown in FIG. 1. TV line numbers are shown at the left of the Figure. As is generally known, the analog video signal is accommodated in the TV lines 23–310 (336–623 in the other field). The TV lines 6–22 (319–335 in the other field) constitute the vertical blanking interval. In the example, lines 10 and 11 are used for transmission of HTML-encoded subtitles, whereas lines 12–16 are used for conventional teletext transmission. The vertical blanking interval in this example happens to include the start of an HTML encoded subtitle, a teletext page header, as well as a teletext packet 8/30. Both the page header and the teletext packet 8/30 include the current time in hh:mm:ss format, which is here 18:22:43. They are denoted 31 and 32, respectively. The subtitle data includes a time stamp 33. The time stamp has the value 18:22:47'12, which means that the subtitle is to be displayed at 18:22:47, 12th frame.

Figure 4:
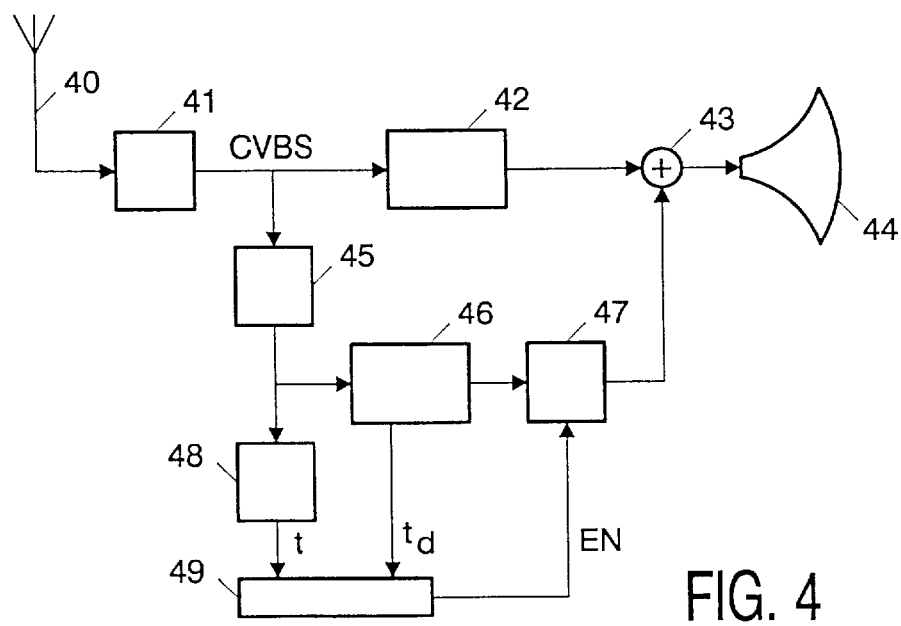
FIG. 4 shows a schematic diagram of a television receiver in accordance with the invention.

FIG. 4 shows a schematic diagram of a television receiver in accordance with the invention. The receiver comprises an input terminal 40, a tuner 41, a video-processing circuit 42, a superimposing circuit 43, a display screen 44, a data slicer 45, a subtitle decoder 46, a character generator 47, a teletext clock extraction circuit 48, and a comparator 49.

The tuner 41 applies the received composite baseband video signal CVBS to the video-processing circuit 42 in which it is processed for reproduction on the display screen 44. The baseband signal CVBS is also applied to the data slicer 45 which regenerates the data signal embedded in the vertical blanking interval of the television signal. The data signal is applied to the teletext clock extraction circuit 48. This circuit is similar to the teletext clock extraction circuit 7 in FIG. 1. It extracts the actual clock time accommodated in teletext page headers or teletext packets 8/30 and includes a phase-locked loop to interpolate the hh:mm:ss format and generate the actual clock time t at the frame rate resolution, i.e. in units of ¹/₂₅ sec (PAL) or ¹/₃₀ sec (NTSC). The data signal is further applied to the subtitle decoder 46, which is arranged to decode HTML-encoded images into RGB or YUV sub-images. The subtitles are decoded upon receipt and stored in the character generator 47. They are not displayed, however, until so enabled in response to an enabling signal EN.

The subtitle decoder 46 also extracts from the subtitle data the time stamp $t_d$ accommodated therein. The time stamp $t_d$ and the actual clock time t are applied to the comparator 49, which produces the enabling signal EN when t and $t_d$ are found to be equal. It is thus achieved that the subtitles will be displayed in correct synchronism with the video contents. With reference to the example of FIG. 3, this means that the subtitle which is transmitted at teletext clock time 18:22:43 will be displayed at 18:22:47, 12th frame.

The invention can be summarized as follows. TeleWeb services are currently being developed, in which HTML-encoded images are transmitted in the vertical blanking interval of a conventional analog television signal. For special applications such as subtitling and targeted advertising, the relevant TeleWeb images must be displayed substantially in synchronism with given video frames of the television signal. This is achieved by transmitting the encoded images in advance and provide them with a time stamp (33) which specifies the display time in terms of a reference clock. The reference clock is preferably derived from the teletext clock time (31,32). A possible display time stamp format is hh:mm:ss'ff, where ff specifies a frame within a second. At the receiver end, the teletext clock is interpolated to reconstruct the reference clock, and the subtitles are buffered until the display time stamp matches the actual clock time.

What is claimed is:

1. A method of transmitting an encoded image in inactive video periods of an analog television signal, for reproduction of said image in synchronism with a given frame of said television signal, the method comprising the steps:

repetitively transmitting, in said inactive video periods, time samples of a reference clock;

estimating, prior to transmission of said given frame of the television signal, the reference clock time at which said given frame will be displayed by a receiver;

accommodating a display time stamp representing said estimated display time in the encoded image data; and transmitting said encoded image data including said display time stamp prior to transmitting the given television frame.

2. The method as claimed in claim 1, wherein said time samples of the reference clock are accommodated in teletext packets 8/30 transmitted in the vertical blanking interval of said television signal.

3. The method as claimed in claim 1, wherein said time samples of the reference clock are accommodated in page headers of teletext pages transmitted in the vertical blanking interval of said television signal.

4. A method of reproducing an image received in inactive video periods of an analog television signal in synchronism with a given frame of said television signal, said method comprising the steps:

receiving and storing encoded image data representing said image and including a display time stamp said display time stamp representing an estimated reference clock time at which said given frame will be displayed be a receiver;

receiving time samples of a reference clock in said inactive video periods of the television signal;

generating a reference clock time in response to said time samples; and reproducing said image when the estimated reference clock time represented by said display time stamp corresponds to the generated reference clock time.

5. The method as claimed in claim 4, wherein said time samples of the reference clock are accommodated in teletext packets 8/30 transmitted in the vertical blanking interval of said television signal.

6. The method as claimed in claim 4, wherein said time samples of the reference clock are accommodated in page headers of teletext pages transmitted in the vertical blanking interval of said television signal.

7. A television receiver for reproducing an image received in inactive video periods of an analog television signal in synchronism with a given frame of said television signal, said television receiver comprising:

means for receiving and storing encoded image data representing said image and including a display time stamp said display time stamp representing an estimated reference clock time at which said given frame will be displayed be a receiver;

means for receiving time samples of a reference clock in said inactive video periods of the television signal, said receiving means generating a reference clock time in response to said time samples; and means for comparing said estimated reference clock time represented by said display time stamp and said the phrase generated reference clock time, said comparing means enabling reproduction of said image when said estimated reference clock time and said generated reference clock time match.

* * * * *